July 25, 1939. F. J. VONDRACEK 2,167,130
MOWER
Filed Jan. 11, 1938
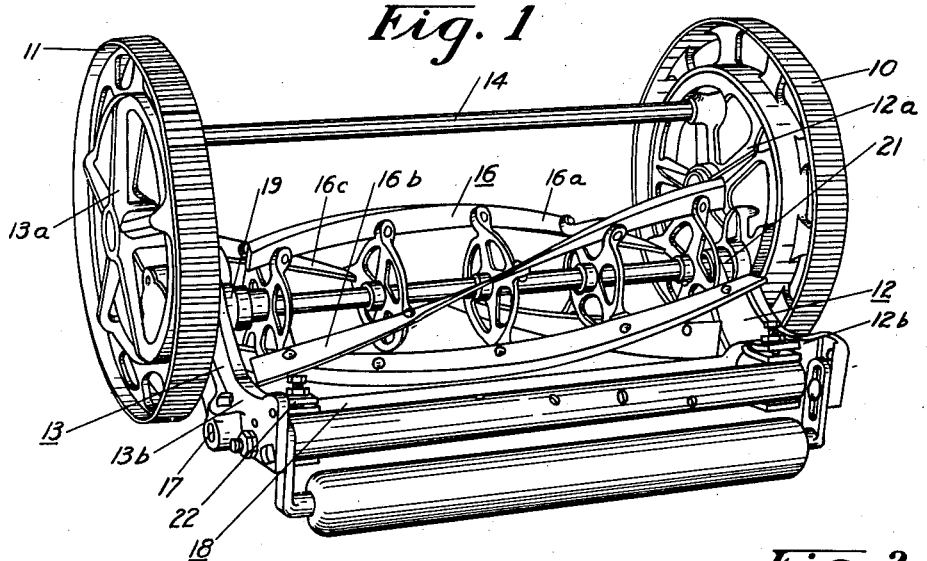
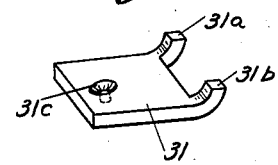
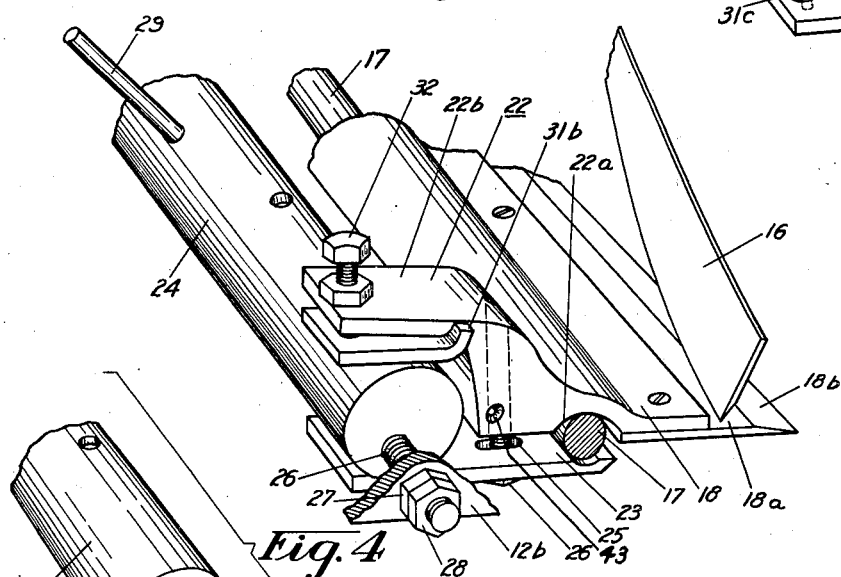
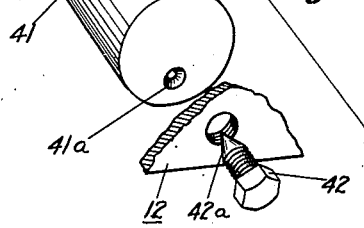
INVENTOR.
FRANK J. VONDRACEK
BY Flournoy Corey
ATTORNEY Patented July 25, 1939

2,167,130

UNITED STATES PATENT OFFICE 2,167,130

MOWER

Frank J. Vondracek, Cedar Rapids, Iowa, assignor of one-tenth to Fred Kubias and one-tenth to Ernest Kosek, both of Cedar Rapids, Iowa Application January 11, 1938, Serial No. 184,381

3 Claims. (Cl. 56—294)

This invention relates to lawn mowers and has particular relation to means for regulating the cutting elements of such machines.

The lawn mowers known to the art cut quite effectively when the mower is new, but as the mower becomes old, from use and oftentimes improper use, the parts become worn and sprung and knocked out of adjustment, thus destroying the effectiveness of the cutting action. Many mowers become practically uesless as a cutting instrument for this reason, and it has been found by actual experience that at least nine out of ten mowers require only adjustment and realignment of the parts to once more become effective cutting instruments. However the mechanism for adjustment of the parts of the machines are relatively complicated and usually only a skilled mechanic can effectively readjust the parts of the machine.

It is, therefore, a general object of my invention to provide a simple and reliable mechanism for supporting and adjusting the parts of a lawn mower, such that anyone, skilled or unskilled, can effectively regulate and adjust the parts of the lawn mower to maintain its effectiveness as a cutting instrument.

It is another general object of my invention to provide a new and improved lawn mower structure.

A feature of my invention is that the regulation of the cutting bar and other parts of the lawn mower is equal at all points along the bar.

Another object of my invention is to provide a plurality of adjusting means for adjusting the cutter plate throughout its length and to provide means for simultaneously regulating these adjusting means to secure uniform adjustment of the plate in one operation.

Other and further features and objects of my invention will be more apparent to those skilled in the art upon a consideration of the following specification taken in conjunction with the drawing in which several embodiments of my invention are shown, with the understanding, however, that such changes may be made therein as fall within the scope of the appended claims, without departing from the spirit of the invention.

In said drawing:

Figure 1 is a view in perspective of a lawn mower illustrating how my adjusting and supporting mechanism is applied to the mower.

Figure 2 is a fragmentary view in perspective illustrating in greater detail the parts shown in Figure 1.

Figure 3 is a view in perspective of a parallel adjustment plate shown in Figure 2, and Figure 4 is a fragmentary view, also in perspective, illustrating a modified form of my invention.

Referring now to the drawing: A mower, shown in Figure 1 thereof includes spoked wheels 10 and 11, which are received on spoked disc-like portions 12a and 13a of side plates 12 and 13. The side plates include also the plate-like portions 12b and 13b extending rearwardly of the mower in accordance with the usual practice, and these side plates 12 and 13 are held in spaced relation by means of a truss bar 14 in front of and above the cutting reel 16, and a second truss bar 17 underneath the cutter bar 18 and to the rear and below the cutting reel 16, all this in accordance with the usual practice. The cutting reel 16 is mounted for rotation in bosses 19 and 21 of the side plates and is driven by means of pinion gears (not shown) located within the side frame members 12 and 13. Internal gears (not shown) are provided within the flanged portions 10b and 11b of wheels 10 and 11, and these gears mesh with the pinion gears to drive the cutting reel in accordance with the usual practice.

In the cutting operation the blades 16a, 16b and 16c of the cutting reel 16 are in close engagement with a cutter blade 18a and it is the shearing action of the blades 16 rubbing on the cutting face 18b of the cutting plate 18a, which cuts the grass and vegetation. The grass is caught, by the forward movement of the mower, between the revolving blades 16 and the plate 18a and is sheared by the rotation of the cutting blades. This structure and operation, of course, is well known in the art and it is apparent that the effectiveness of the mower as a cutting instrument depends to a great extent on the proper and complete regulation of the spacing of the cutter bar plate 18a with reference to the blades 16.

I propose to supply a simple, effective and foolproof means for simultaneously adjusting the cutter bar 18 up and down with reference to the blades and for effecting multiple adjustment of a plurality of regulating means.

In practicing my invention I preferably utilize the truss bar or tie bar 17 as a pivot shaft about which the cutter bar and adjusting mechanism may rotate or oscillate in effecting adjustment of the cutter plate with reference to the blades. The cutter bar 18 is mounted upon the truss bar 17 by means of brackets 22 and clamping members 23, one at each end of the cutter bar, the bracket 22 and cutter bar 18 being recessed at 22a to receive the truss bar 17. The brackets 22 are roughly of S shape with one portion of the S figure engaging the truss bar 17 and the other forming a flange, indicated at 22b, for engaging an eccentric 24. The bracket plate 23 is clamped on the truss bar 17 and the eccentric 24 by means of bolts 26, these bolts 26 being drawn sufficiently tight to afford a clamping means with the brackets or clamping members 22 such that movement of the cutter bar with reference to the truss bar 17 is restricted by the frictional engagement of the clamping means on the truss bar; that is there is sufficient friction between these members that they do not turn freely. The openings 25 in the plates 23, through which the bolts 26 pass, are slotted to permit limited movement, forward and back, while the device is being assembled.

The eccentric member 24 preferably consists of a hollow tube or pipe closed at the ends, as indicated at 24a. In one embodiment of the invention stud bolts 26 are threaded into the end walls 24a of the eccentric member 24 and these stud bolts are offset with reference to the central axis of the adjusting tube or eccentric 24. The stud bolts 26 pass through the side plates 12 and 13, as illustrated in Figure 1. A centering nut 27 is provided on each stud bolt 26 for properly centering the adjusting tube 24 with reference to the side plates and locking nuts 28 are provided for locking the centering nuts 27 when the adjusting tube 24 is in the desired position. It is now apparent that rotation of the adjusting tube 24, as by means of a bar or the like indicated at 29, will result in up or down movement of the bracket 22 to produce opposite movement of the cutter plate 18a to adjust its spacing with reference to the blades 16.

The eccentricity of the adjusting tube 24, with reference to the stud bolts 26, may be so chosen that rotation of the tube 24 through 180 degrees will result in only a small up or down movement of the cutter plate 18a and this is, of course, of material advantage since the adjustment of the cutter plate may be regulated in quite small increments.

In rotating the adjusting tube 24 it is apparent that not only will up and down movement of the tube occur, but also some movement front and rear. It is desirable that the bracket 22 be tightly clamped on the tube 24 at all times regardless of the position of the adjusting tube, up or down, front or rear. Therefore I preferably provide parallel adjusting plates 31 for each of the clamps 22. These plates are provided with two lugs 31a and 31b on the front end thereof, which may project on opposite sides of the bracket 22 and the upper face of the adjusting plates 31 are cupped, as indicated at 31c, in order to receive the rounded points of alignment bolts 32. These bolts 32 may be adjusted up and down to cause the plate 31 to clamp the tube 24 with any desired degree of frictional engagement, and, furthermore, may be adjusted to be in perfect parallel alignment with the clamping plates 23, whereby the frictional engagement of the bracket 22 with reference to the tube 24 will always be the same. Of course the brackets 22 are located at opposite ends of the cutter bar 18, or there may be one or more of these brackets intermediate of the ends of the cutter bar 18, and the adjusting tube 24.

It will be readily understood that movement of the brackets 22 up or down is simultaneous on rotation of the adjusting tube 24 and, furthermore, that small adjustments of the ends of the cutter bar 18 may be secured by means of adjusting the bolts 26 and alignment bolts 32. In other words all points of the cutter bar 18 may be made to move up or down simultaneously by means of my device, or one end or the other may be adjusted up or down as desired. Such adjustments of the cutter bar with reference to the blades 16 may be accomplished by any operator no matter how unskilled he may be. The cutting edges may be maintained in proper alignment and position at all times, so as to maintain the mower in its most effective condition as a cutting means.

The structure herein disclosed may be modified for different styles of lawn mowers. For instance in one style of mower it may be more desirable to provide the ends of the adjusting tube 41 with conical recesses, indicated at 41a, and to utilize bolts 42 having conical points as indicated at 42a, the bolts 42 acting as pivot pins for the adjusting tube 41.

In other types of mowers the lower rear truss bar, illustrated at 17, is not used, in which case it is only necessary to employ bolts such as illustrated at 42, which may be threaded through the side plates 12 and 13 and received in conical openings 43 in the clamps 22.

Modifications of my invention may be made by those skilled in the art. Such modifications may be made without departing from the spirit and scope of my invention as set forth in the appended claims.

I claim as my invention:

1. A cutter bar for use in a mower having a cutting reel, and having side plates in which the cutting reel is rotatably mounted, means for pivotally mounting the cutter bar with reference to the side plates, brackets integral with the cutter bar and extending rearwardly thereof, an alignment adjustment plate for each of the brackets pivotally engaged beneath each bracket, a plate and a bolt for each of the brackets, an eccentric extending across the mower in parallel relation to the cutter bar received between the plate and the alignment adjustment plate of each of the brackets, and means for pivotally engaging the eccentric to the side plates comprising bolts threaded into the ends of the eccentric in off-center relation with respect to the center axis thereof, said bolts being received in the side plates.

2. A cutter bar for use in a mower having a cutting reel, and side plates in which the cutter reel is rotatably mounted, means for pivotally mounting the cutter bar with reference to the side plates, brackets integral with the cutter bar and extending rearwardly thereof, an alignment adjustment plate for each of the brackets pivotally engaged beneath each bracket, a plate and a bolt for each of the brackets, an eccentric extending across the mower in parallel relation to the cutter bar received between the plate and the alignment adjustment plate of each of the brackets, means for pivotally engaging the eccentric to the side plates comprising screws threaded into the side plates, the screws having conical points, and the ends of the eccentric each having an offset recess in the end walls thereof for receiving the conical ends of the screws.

3. A cutter means and adjustment means for same for use in a mower having a cutting reel, side plates in which the cutting reel is rotatably mounted and a truss bar mounted between the side plates at the lower portions thereof, said cutter means and adjustment means including a cutter bar, a cutter blade extending forwardly therefrom, the cutter bar having a depression therein adapted to be engaged over the truss bar, an eccentric extending parallel to and the entire length of the cutter bar and located at the rear thereof, means for pivotally engaging the eccentric to the side plates, bracket members at each end of the cutter bar extending rearwardly over the eccentric, alignment adjustment plates between the brackets and the eccentric, screw means threadedly engaged in the brackets and bearing against the alignment adjustment plates, and bracket plates adjustably clamped against the truss bar and the eccentric by means of threaded members extending through the bracket plates and the brackets.

FRANK J. VONDRACEK.